United States Patent  
Karcewski

(10) Patent No.: US 9,974,404 B1  
(45) Date of Patent: May 22, 2018

(54) DRINK COASTER THAT COLLECTS CONDENSATION

(71) Applicant: Cindy Karcewski, Downingtown, PA (US)

(72) Inventor: Cindy Karcewski, Downingtown, PA (US)

(*) Notice: Subject to any disclaimer, the term of this patent is extended or adjusted under 35 U.S.C. 154(b) by 0 days. days.

(21) Appl. No.: 15/652,361

(22) Filed: Jul. 18, 2017

(51) Int. Cl.
A47G 23/03 (2006.01)
F16B 47/00 (2006.01)

(52) U.S. Cl.
CPC .............. A47G 23/03 (2013.01); F16B 47/00 (2013.01)

(58) Field of Classification Search
CPC ...... F16B 47/00; A47G 23/03; A47G 23/0316
USPC ........................................ 248/346.03, 346.11
See application file for complete search history.

(56) References Cited

U.S. PATENT DOCUMENTS

| 1,925,241 | A |   | 9/1933  | Fullerton |           |
|-----------|---|---|---------|-----------|-----------|
| 2,131,878 | A | * | 10/1938 | Lawrence  | A47G 23/03 |
|           |   |   |         |           | 215/394   |
| 2,561,127 | A |   | 7/1951  | Lockwood  |           |
| 2,641,911 | A | * | 6/1953  | Raymond   | A47G 23/03 |
|           |   |   |         |           | 215/394   |
| 2,740,545 | A | * | 4/1956  | Bates     | A47G 23/03 |
|           |   |   |         |           | 215/394   |
| 3,094,235 | A | * | 6/1963  | Luning    | A47G 23/03 |
|           |   |   |         |           | 215/393   |
| 3,268,198 | A | * | 8/1966  | Swett     | A47G 23/03 |
|           |   |   |         |           | 248/346.11 |
| 4,759,525 | A | * | 7/1988  | Cross     | A47B 13/16 |
|           |   |   |         |           | 248/206.2 |
| 5,273,182 | A |   | 12/1993 | Laybourne |           |
| D357,388  | S |   | 4/1995  | Gaffin    |           |
| 6,089,519 | A |   | 7/2000  | Laybourne |           |
| 2007/0228243 | A1 |   | 10/2007 | Phillips  |           |
| 2017/0020319 | A1 |   | 1/2017  | Detweiler |           |

* cited by examiner

Primary Examiner — Anita M King
(74) Attorney, Agent, or Firm — Kyle A. Fletcher, Esq.

(57) ABSTRACT

The drink coaster that collects condensation is configured for use with a fluid container. The containment vessel holds a liquid that is intended for consumption by a person. The drink coaster that collects condensation is a pedestal that forms an intermediate structure between a supporting surface and the fluid container. The drink coaster that collects condensation attaches to the inferior end of the fluid container. The drink coaster that collects condensation captures and stores condensation in a well that is formed by the drink coaster that collects condensation. The drink coaster that collects condensation comprises a suction cup and a rim. The rim is formed on the perimeter of the suction cup. The suction cup attaches the drink coaster that collects condensation to the inferior end of the fluid container. The rim is a semi-rigid structure that is used to form the well.

18 Claims, 3 Drawing Sheets

DRINK COASTER THAT COLLECTS CONDENSATION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal or domestic articles including table equipment, more specifically, an underlay for a glass or drinking vessel.

SUMMARY OF INVENTION

The drink coaster that collects condensation is configured for use with a fluid container. The fluid container is a containment vessel. The fluid container is further defined with an inferior end and a superior end. It is anticipated that the containment vessel is designed to hold a liquid that is intended for consumption by a person. The drink coaster that collects condensation is a pedestal that forms an intermediate structure between a supporting surface and the fluid container. The drink coaster that collects condensation attaches to the inferior end of the fluid container. The drink coaster that collects condensation protects the supporting surface from damage caused by condensation forming on the side of the fluid container. The drink coaster that collects condensation captures and stores this condensation in a well that is formed by the drink coaster that collects condensation. The drink coaster that collects condensation comprises a suction cup and a rim. The rim is formed on the perimeter of the suction cup. The suction cup attaches the drink coaster that collects condensation to the inferior end of the fluid container. The rim is a semi-rigid structure that is used to form the well.

These together with additional objects, features and advantages of the drink coaster that collects condensation will be readily apparent to those of ordinary skill in the art upon reading the following detailed description of the presently preferred, but nonetheless illustrative, embodiments when taken in conjunction with the accompanying drawings.

In this respect, before explaining the current embodiments of the drink coaster that collects condensation in detail, it is to be understood that the drink coaster that collects condensation is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the drink coaster that collects condensation.

It is therefore important that the claims be regarded as including such equivalent construction insofar as they do not depart from the spirit and scope of the drink coaster that collects condensation. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
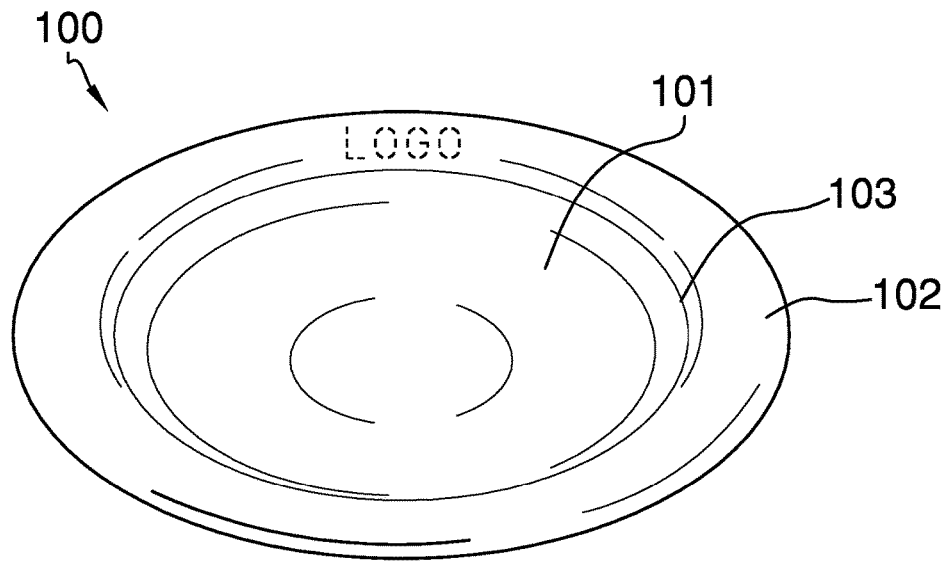
FIG. 1 is a perspective view of an embodiment of the disclosure.
Figure 2:
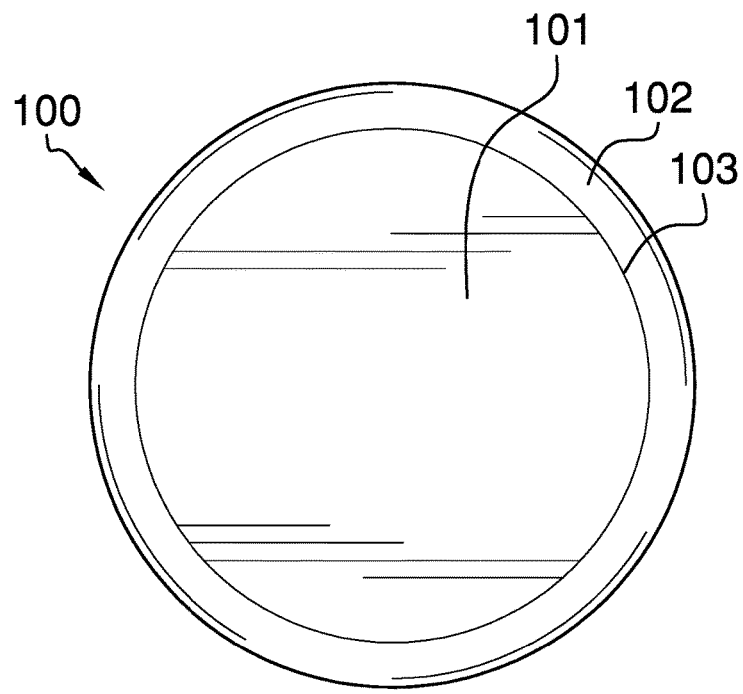
FIG. 2 is a bottom view of an embodiment of the disclosure.
Figure 3:
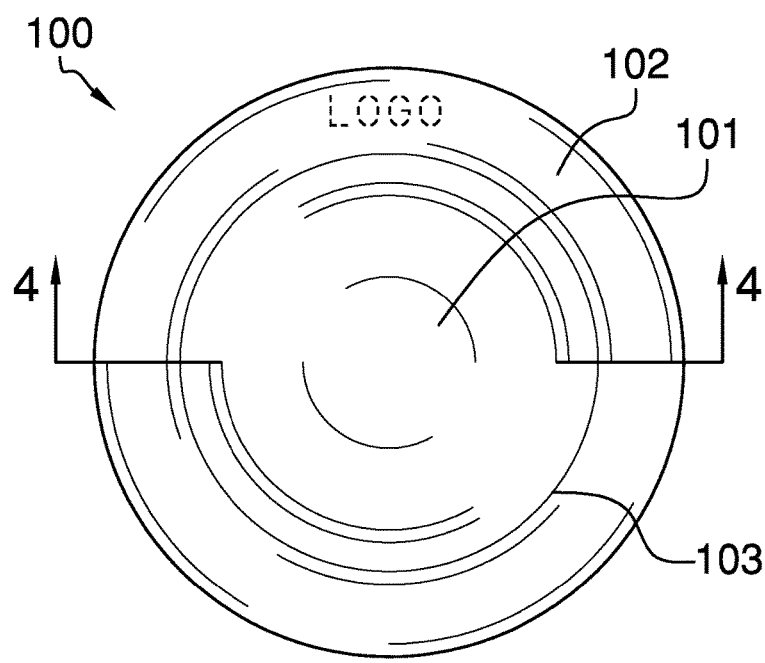
FIG. 3 is a top view of an embodiment of the disclosure.
Figure 4:
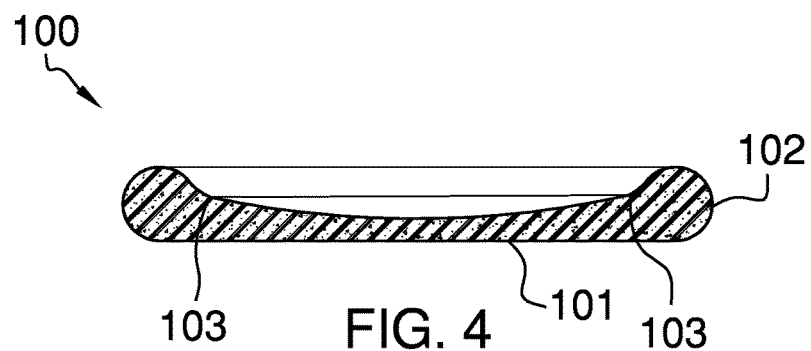
FIG. 4 is a cross-sectional view of an embodiment of the disclosure across 4-4 as shown in FIG. 3.
Figure 5:
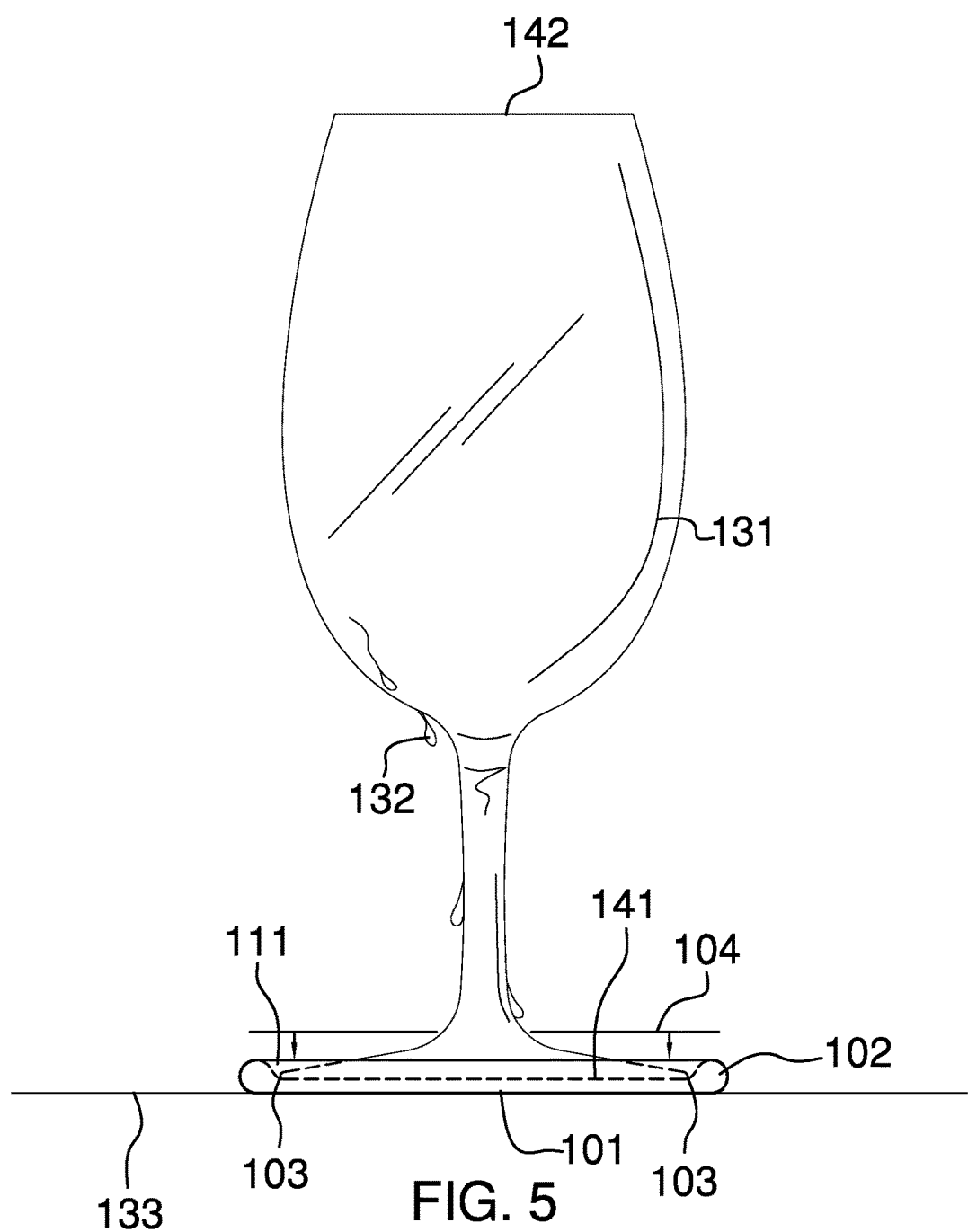
FIG. 5 is an in use view of an embodiment of the disclosure.

Detailed reference will now be made to one or more potential embodiments of the disclosure, which are illustrated in FIGS. 1 through 5.

The drink coaster that collects condensation 100 (hereinafter invention) is configured for use with a fluid container 131. The fluid container 131 is a containment vessel. The fluid container 131 is further defined with an inferior end 141 and a superior end 142. It is anticipated that the containment vessel is designed to hold a liquid that is intended for consumption by a person. The invention 100 is a pedestal that forms an intermediate structure between a supporting surface 133 and the fluid container 131. The invention 100 attaches to the inferior end 141 of the fluid container 131. The invention 100 protects the supporting surface 133 from damage caused by condensation 132 forming on the side of the fluid container 131. The invention 100 captures and stores this condensation 132 in a well 111 that is formed by the invention 100. The invention 100 comprises a suction cup 101, a rim 102, and a living hinge 103. The rim 102 is formed on the perimeter of the suction cup 101. The suction cup 101 attaches the invention 100 to the inferior end 141 of the fluid container 131. The rim 102 is a semi-rigid structure that is used to form the well 111. The living hinge 103 attaches the rim 102 to the suction cup 101. In a second potential embodiment of the disclosure, an absorbent sheeting 104 is placed between the inferior end 141 of the fluid container 131 and invention 100 to enhance the collection of condensation 132.

The fluid container 131 is a containment vessel that is intended to hold a liquid for consumption. The condensation 132 refers to an accumulation of water on the exterior surface of the fluid container 131. Condensation 132 occurs when the temperature differential between the fluid container 131 and the surrounding air causes water vapor to condense and form on the exterior surface of the fluid container 131. The supporting surface 133 refers to a horizontal surface upon which the fluid container 131 is placed. The inferior end 141 refers to the end of the fluid container 131 which is placed on the supporting surface 133 during normal use of the fluid container 131. The superior end 142 refers to the end of the fluid container 131 that: 1) is distal from the inferior end 141; and, 2) into which and from which liquids are normally introduced and removed from the fluid container 131.

In the first potential embodiment of the disclosure, it is anticipated that invention 100 will be made as a single integrated unit. Nevertheless, within this disclosure it will be assumed that the invention 100 is formed from three components: the suction cup 101, the rim 102, and the living hinge 103. This assumption is made for the purposes of simplicity and clarity of exposition and is not intended to limit the scope of this disclosure. Those skilled in the mechanical arts will recognize that this simplifying assumption will not in any way limit the operation of the invention 100 and should not be interpreted to in any way limit the scope of the claims.

The suction cup 101 is a curved semi-rigid structure that is formed from a fluid impermeable material. The suction cup 101 is formed with a single edge that forms a perimeter with a circular shape. When the suction cup 101 is pressed against the inferior end 141 of the fluid container 131, a vacuum is formed that seals the suction cup 101 to the fluid container 131. This vacuum seal in turn attaches the suction cup 101 to the fluid container 131. Suction cups are discussed in greater detail elsewhere in this disclosure. Methods to design and form a suction cup 101 are well known and documented in the mechanical and polymer arts.

The rim 102 is a semi-rigid ring structure that attaches to the perimeter of the suction cup 101. The semi-rigid structure of the rim 102 is non-elastic in nature. The rim 102 is formed from a fluid impermeable material. The rim 102 forms a border around the perimeter of the suction cup 101 that collections condensation 132 as if falls away from the fluid container 131. The rim 102 encloses the suction cup 101 in a coaxial manner. The border formed the rim 102 projects radially away from the center of the suction cup 101.

The combination of the rim 102 and the living hinge 103 forms a well 111 within which the condensation 132 from the fluid container 131 is collected. The well 111 is a containment volume that is intended to collect and store condensation 132 from the fluid container 131. As shown most clearly in FIG. 5, the well 111 is formed by using the living hinge 103 to adjust the cant between the rim 102 and the suction cup 101.

The living hinge 103 is a flexure bearing that attaches the rim 102 to the perimeter of the suction cup 101. The living hinge 103 is used to adjust the cant between the rim 102 and the suction cup 101. The living hinge 103 is a flexible joint that is formed between the rim 102 and the suction cup 101.

In the first potential embodiment of the disclosure, the flexible nature of the living hinge 103 is formed by reducing the depth of the living hinge 103 relative to the depths of the suction cup 101 and the rim 102.

Living hinges are discussed in greater detail elsewhere in this disclosure. Methods to design and fabricate a living hinge 103 are well known in the mechanical arts and the polymer arts.

In a second potential embodiment of the disclosure, the invention 100 further comprises an absorbent sheeting 104. The absorbent sheeting 104 is a disposable sheeting formed in the shape of a ring. The sheeting that forms the absorbent sheeting 104 is formed from an absorbent material such as paper. The absorbent sheeting 104 is sized such that the absorbent sheeting 104 may be placed directly over the rim 102.

To use the invention 100, the suction cup 101 is attached to the inferior end 141 of the fluid container 131. The cant of the rim 102 is then adjusted to form the well 111 within which the condensation 132 will be collected. The fluid container 131 is then used normally. After the fluid container 131 is emptied, the invention 100 is removed from the fluid container 131 by breaking the seal formed by the suction cup 101.

The following definitions were used in this disclosure:

Absorbent: As used in this disclosure, absorbent is an adjective that refers to a material that is able to soak up a liquid such as water.

Cant: As used in this disclosure, a cant is an angular deviation from one or more reference planes such as a vertical plane or a horizontal plane.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Coaxial: As used in this disclosure, coaxial is an term that refers to a first object that is inserted or contained within a second object such: 1) that the first object and the second object share the same center point if the or first object and the second object are treated as a two dimensional objects; or, 2) that the first object and the second object share the same center axis if the or first object and the second object are treated as a prism.

Disposable: As used in this disclosure, disposable is an adjective that refers to an object that is designed and intended for a single use. Within this context, an object would be considered disposable if it is not reusable after its initial use.

Exterior: As used in this disclosure, the exterior is use as a relational term that implies that an object is not contained within the boundary of a structure or a space.

Flexure Bearing: As used in this disclosure, a flexure bearing is a thin and flexible material that is used to attach, or bind, a first object to a second object such that the first object can rotate in a controlled direction relative to the second object.

Fluid: As used in this disclosure, a fluid refers to a state of matter wherein the matter is capable of flow and takes the shape of a container it is placed within. The term fluid commonly refers to a liquid or a gas.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Liquid: As used in this disclosure, a liquid refers to a state of matter that is fluid and that maintains, for a given pressure, a fixed volume that is independent of the volume of the container.

Living Hinge: As used in this disclosure, refers to a single semi-rigid structure that is formed out of one or more semi-rigid materials that are divided into a first segment, a second segment and the living hinge. The semi-rigid nature of the one or more semi-rigid materials allow the living hinge to be flexed in the manner of a hinge allowing the first segment to rotate relative to the second hinge. The living hinge is a form of a flexure bearing. A material that is formed with a series living hinges is referred to as a kerf bending. A kerf bending formed in a plate allows the plate to be bent into a curved shape.

Pedestal: As used in this disclosure, a pedestal is an intermediary load bearing structure that is placed between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Plasticity: As used in this disclosure, plasticity refers to a material that is easily shaped or molded.

Rim: As used in this disclosure, a rim is an outer edge or border that follows along the perimeter of an object.

Ring: As used in this disclosure, a ring is term that is used to describe a flat or plate like structure through which an aperture is formed.

Semi-Rigid Structure: As used in this disclosure, a semi-rigid structure is a solid structure that will deform under force before breaking. A semi-rigid structure may or may not behave in an elastic fashion in that a semi-rigid structure need not return to a relaxed shape.

Sheeting: As used in this disclosure, sheeting is a material, such as a textile, a plastic, or a metal foil, in the form of a thin flexible layer or layers.

Suction Cup: As used in this disclosure, a suction cup means an object or device that uses negative fluid pressure of air or water to adhere to nonporous surfaces by creating a partial vacuum.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Vacuum: As used in this disclosure, vacuum is used to describe a first space that contains gas at a reduced gas pressure relative to the gas pressure of a second space. If the first space and the second space are connected together, this pressure differential will cause gas from the second space to move towards the first space until the pressure differential is eliminated.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An underlay for a glass or drinking vessel comprising:
a suction cup, a rim, and a living hinge;
wherein the living hinge attaches the rim to the suction cup;
wherein the underlay for a glass or drinking vessel is configured for use with a fluid container;
wherein the fluid container is a containment vessel;
wherein the fluid container is further defined with an inferior end and a superior end;
wherein the underlay for a glass or drinking vessel is a pedestal that forms an intermediate structure between a supporting surface and the fluid container;
wherein the underlay for a glass or drinking vessel attaches to the inferior end of the fluid container;
wherein the underlay for a glass or drinking vessel captures and stores condensation formed on the exterior surface of the fluid container in a well that is formed by the underlay for a glass or drinking vessel;
wherein the rim attaches to the perimeter of the suction cup;
wherein the rim is a semi-rigid structure;
wherein the combination of the rim and the living hinge forms the well within which the condensation from the fluid container is collected;
wherein the well is a containment volume that collects and stores condensation from the fluid container.

2. The underlay for a glass or drinking vessel according to claim 1
wherein the well is formed by using the living hinge to adjust the cant between the rim and the suction cup;
wherein the well is adjustable.

3. The underlay for a glass or drinking vessel according to claim 2
wherein the suction cup is a curved semi-rigid structure;
wherein the suction cup is formed from a fluid impermeable material.

4. The underlay for a glass or drinking vessel according to claim 3 wherein the suction cup is formed with a single edge that forms a perimeter with a circular shape.

5. The underlay for a glass or drinking vessel according to claim 4 wherein when the suction cup is pressed against the inferior end of the fluid container, a vacuum is formed that seals the suction cup to the fluid container.

6. The underlay for a glass or drinking vessel according to claim 5
wherein the rim is a semi-rigid ring structure;
wherein the semi-rigid structure of the rim is non-elastic in nature;
wherein the rim is formed from a fluid impermeable material.

7. The underlay for a glass or drinking vessel according to claim 6
wherein the rim encloses the suction cup in a coaxial manner;
wherein the border formed the rim projects radially away from the center of the suction cup;
wherein the rim forms a border around the perimeter of the suction cup;
wherein the border formed by the rim collection condensation as if falls away from the fluid container.

8. The underlay for a glass or drinking vessel according to claim 7 wherein the living hinge is a flexure bearing that forms a flexible joint between the rim and the suction cup.

9. The underlay for a glass or drinking vessel according to claim 8 wherein the living hinge is formed by adjusting the depth of the living hinge relative to the depths of the suction cup and the rim.

10. An underlay for a glass or drinking vessel comprising:
a suction cup, a rim, a living hinge, and an absorbent sheeting;
wherein the living hinge attaches the rim to the suction cup;
wherein the underlay for a glass or drinking vessel is configured for use with a fluid container;
wherein the fluid container is a containment vessel;
wherein the fluid container is further defined with an inferior end and a superior end;
wherein the underlay for a glass or drinking vessel is a pedestal that forms an intermediate structure between a supporting surface and the fluid container;
wherein the underlay for a glass or drinking vessel attaches to the inferior end of the fluid container;
wherein the underlay for a glass or drinking vessel captures and stores condensation formed on the exterior surface of the fluid container in a well that is formed by the underlay for a glass or drinking vessel;
wherein the absorbent sheeting enhances the collection capacity of the well;
wherein the rim attaches to the perimeter of the suction cup;
wherein the rim is a semi-rigid structure;
wherein the combination of the rim and the living hinge forms the well within which the condensation from the fluid container is collected;
wherein the well is a containment volume that collects and stores condensation from the fluid container.

11. The underlay for a glass or drinking vessel according to claim 10
wherein the well is formed by using the living hinge to adjust the cant between the rim and the suction cup;
wherein the well is adjustable.

12. The underlay for a glass or drinking vessel according to claim 11
wherein the suction cup is a curved semi-rigid structure;
wherein the suction cup is formed from a fluid impermeable material;
wherein the suction cup is formed with a single edge that forms a perimeter with a circular shape.

13. The underlay for a glass or drinking vessel according to claim 12 wherein when the suction cup is pressed against the inferior end of the fluid container, a vacuum is formed that seals the suction cup to the fluid container.

14. The underlay for a glass or drinking vessel according to claim 13
wherein the rim is a semi-rigid ring structure;
wherein the semi-rigid structure of the rim is non-elastic in nature;
wherein the rim is formed from a fluid impermeable material.

15. The underlay for a glass or drinking vessel according to claim 14
wherein the rim encloses the suction cup in a coaxial manner;
wherein the border formed the rim projects radially away from the center of the suction cup;
wherein the rim forms a border around the perimeter of the suction cup;
wherein the border formed by the rim collection condensation as if falls away from the fluid container.

16. The underlay for a glass or drinking vessel according to claim 15 wherein the living hinge is a flexure bearing that forms a flexible joint between the rim and the suction cup.

17. The underlay for a glass or drinking vessel according to claim 16 wherein the living hinge is formed by adjusting the depth of the living hinge relative to the depths of the suction cup and the rim.

18. The underlay for a glass or drinking vessel according to claim 17
wherein the absorbent sheeting is a disposable;
wherein the absorbent sheeting is sheeting formed in the shape of a ring;
wherein the sheeting that forms the absorbent sheeting is formed from an absorbent material;
wherein the absorbent sheeting is sized such that the absorbent sheeting may be placed directly over the rim;
wherein the absorbent sheeting forms a barrier between the inferior end of the fluid container and underlay for a glass or drinking vessel.

\* \* \* \* \*